United States Patent
Reynolds

(10) Patent No.: US 9,140,168 B2
(45) Date of Patent: Sep. 22, 2015

(54) EXHAUST BYPASS FLOW CONTROL FOR EXHAUST HEAT RECOVERY

(75) Inventor: Michael G. Reynolds, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 837 days.

(21) Appl. No.: 12/752,648

(22) Filed: Apr. 1, 2010

(65) Prior Publication Data
US 2011/0239634 A1 Oct. 6, 2011

(51) Int. Cl.
F02D 23/00 (2006.01)
F01N 5/02 (2006.01)
F02G 5/02 (2006.01)

(52) U.S. Cl.
CPC .. *F01N 5/02* (2013.01); *F02G 5/02* (2013.01); F01N 2240/02 (2013.01); Y02T 10/16 (2013.01); Y02T 10/166 (2013.01)
USPC ............. 60/602; 60/320; 60/600; 123/568.12

(58) Field of Classification Search
CPC ..... F01N 5/02; F01N 13/001; F01N 2240/02; F01N 2900/1811; F01N 2900/1812
USPC ................... 60/614, 616, 604, 320, 600, 602; 123/568.12
See application file for complete search history.

(56) References Cited

U.S. PATENT DOCUMENTS 6,141,961 A 11/2000 Rinckel
6,367,256 B1* 4/2002 McKee .......................... 60/605.2
7,032,577 B2* 4/2006 Rosin et al. ............... 123/568.12
7,654,312 B2 2/2010 Baeuerle et al.
7,798,268 B2* 9/2010 Rider ............................ 180/68.1
8,086,386 B2* 12/2011 Bakharev ....................... 701/103
8,341,951 B2* 1/2013 Prior et al. ....................... 60/320
2007/0017489 A1 1/2007 Kuroki et al.
2007/0289581 A1 12/2007 Nakamura

FOREIGN PATENT DOCUMENTS

DE 102004061809 A1 7/2006
DE 102006000348 A1 2/2007
FR 2933734 A1 1/2010

OTHER PUBLICATIONS

Office Action dated Nov. 21, 2012 for Chinese Patent Application No. 201110132323.2; 9 pages.
German Office Action for Application No. 102011015262.8 dated Aug. 20, 2014; 8 pages.

* cited by examiner

Primary Examiner — Ching Chang
(74) Attorney, Agent, or Firm — Cantor Colburn LLP

(57) ABSTRACT

An exhaust system for an engine comprises an exhaust heat recovery apparatus configured to receive exhaust gas from the engine and comprises a first flow passage in fluid communication with the exhaust gas and a second flow passage in fluid communication with the exhaust gas. A heat exchanger/energy recovery unit is disposed in the second flow passage and has a working fluid circulating therethrough for exchange of heat from the exhaust gas to the working fluid. A control valve is disposed downstream of the first and the second flow passages in a low temperature region of the exhaust heat recovery apparatus to direct exhaust gas through the first flow passage or the second flow passage.

3 Claims, 5 Drawing Sheets

EXHAUST BYPASS FLOW CONTROL FOR EXHAUST HEAT RECOVERY

FEDERAL RESEARCH STATEMENT

This invention was made with U.S. Government support under Agreement No. DE-FC26-04NT42278, awarded by the Department of Energy. The U.S. Government may have certain rights in this invention.

FIELD OF THE INVENTION

Exemplary embodiments of the present invention relate to exhaust heat recovery systems for internal combustion engines and, more particularly, to an exhaust heat recovery apparatus having a robust exhaust bypass flow control.

BACKGROUND

Increases in fuel prices as well as in the regulation of exhaust gas emissions have resulted in an increase in the popularity of more fuel efficient propulsion systems for automobiles. High efficiency internal combustion engines, diesel engines and hybrid propulsion systems, that utilize a propulsion combination of an electric motor and an internal combustion engine, are just some of the solutions that vehicle designers are considering to solve the efficiency and regulatory challenges. With conventional, non-hybrid powertrains, about 30 percent of the fuel energy is lost to the exhaust system in the form of waste heat. With hybrid propulsion systems, the maintenance of appropriate temperatures in the engine, the transmission, the exhaust system and in the passenger compartment during cold ambient temperature operation may be a challenge due to frequent starting and stopping of the internal combustion engine.

In either case, the engine exhaust system with its large temperature differential vis-à-vis the ambient, for instance, is a convenient target for recovering useful energy in the form of waste heat for use elsewhere in the vehicle. A heat exchanger may be associated with the engine exhaust system and may, for instance, use engine coolant, or another working fluid, to extract waste heat from the exhaust flow through the exhaust system. Heat recovered by a heat exchanger may be used to assist in rapidly heating the engine or transmission following a cold start to reduce friction and increase system efficiency. Alternatively, the recovered heat may be used to generate electricity through thermo-electric power generation in which a temperature differential creates a voltage which may be used by the vehicle's electrical system. Because exhaust temperatures may vary widely across operating cycles (from about 300° C. to about 1000° C.) the various vehicle systems that utilize the recovered exhaust heat, including the heat exchanger itself, must be monitored for over-temperature conditions in which the recovered heat or energy can be detrimental. While the exhaust temperature is not easily controlled, in such instances it is typical to bypass the engine exhaust gas around the heat exchanger for release to the atmosphere after appropriate treatment in various exhaust treatment devices. Bypass of the exhaust gas around the heat exchanger can require the use of a bypass valve mounted in fluid communication with the hot exhaust gas. In such an environment, the valve is subjected to extreme harshness requiring very robust and often expensive designs and materials.

SUMMARY OF THE INVENTION

In an exemplary embodiment, an exhaust system for an internal combustion engine comprises an exhaust gas conduit configured to receive an exhaust gas from an exhaust port of the internal combustion engine. A downstream exhaust heat recovery apparatus is configured to receive the exhaust gas, and further comprises a first flow passage in fluid communication with the exhaust gas conduit and a second flow passage in fluid communication with the exhaust gas conduit. A heat exchanger/energy recovery unit is disposed in the second flow passage and has a working fluid inlet and outlet for circulation of a working fluid therethrough and exchange of heat from the exhaust gas to the working fluid. A flow control valve is disposed downstream of the first and the second flow passages in a low temperature region of the exhaust heat recovery apparatus to direct exhaust gas through the first flow passage, the second flow passage or a combination thereof.

In another exemplary embodiment, an exhaust system for an internal combustion engine comprises an exhaust gas conduit configured to receive an exhaust gas from an exhaust port of an internal combustion engine. A downstream exhaust heat recovery apparatus is configured to receive the exhaust gas and further comprises a volumetrically enlarged portion. A longitudinally extending flow divider is disposed in the volumetrically enlarged portion and defines a first flow passage in fluid communication with the exhaust gas conduit and a second flow passage in fluid communication with the exhaust gas conduit. A heat exchanger/energy recovery unit is disposed in the second flow passage and has a working fluid inlet and outlet for circulation of a working fluid therethrough and exchange of heat from the exhaust gas to the working fluid. A flow control valve is pivotally connected to a downstream end of the flow divider in a low temperature region of the exhaust heat recovery apparatus and is configured to direct exhaust gas through the first flow passage, the second flow passage or a combination thereof.

In yet another exemplary embodiment, a method of operating an exhaust system for an internal combustion engine having an exhaust gas conduit configured to receive an exhaust gas from an exhaust port of an internal combustion engine, a downstream exhaust heat recovery apparatus configured to receive the exhaust gas, the exhaust heat recovery apparatus including a first flow passage in fluid communication with the exhaust gas conduit, a second flow passage in fluid communication with the exhaust gas conduit, a heat exchanger/energy recovery unit disposed in the second flow passage and having a working fluid inlet and outlet for circulation of a working fluid therethrough and exchange of heat from the exhaust gas to the working fluid, and a flow control valve disposed downstream of the first and the second flow passages in a lower temperature region of the exhaust heat recovery apparatus to direct exhaust gas through the first flow passage or the second flow passage comprises determining heat or energy requirements of various vehicle systems, actuating the flow control valve to direct exhaust gas through the second flow passage and the heat exchanger/energy recovery unit if heat or energy is required by the various vehicle systems, and actuating the flow control valve to direct exhaust gas through the first flow passage if heat or energy is not required by the various vehicle systems.

The above features and advantages, and other features and advantages of the present invention are readily apparent from the following detailed description of the best modes for carrying out the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
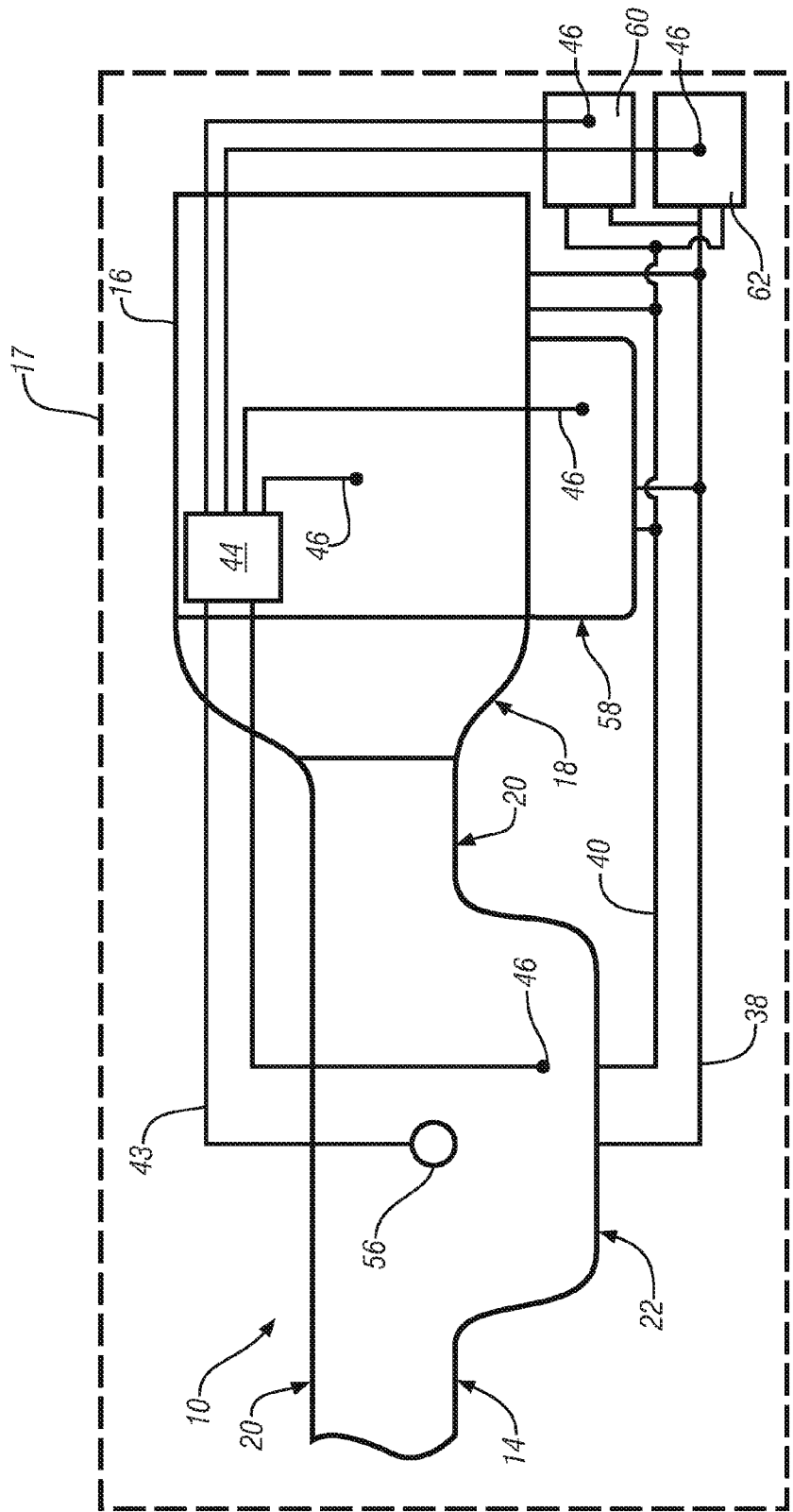
FIG. 1 is a schematic view of a vehicle having an internal combustion engine and associated exhaust treatment system embodying features of the present invention.

The following description is merely exemplary in nature and is not intended to limit the present disclosure, application or uses. It should be understood that throughout the drawings, corresponding reference numerals indicate like or corresponding parts and features.

Figure 2:
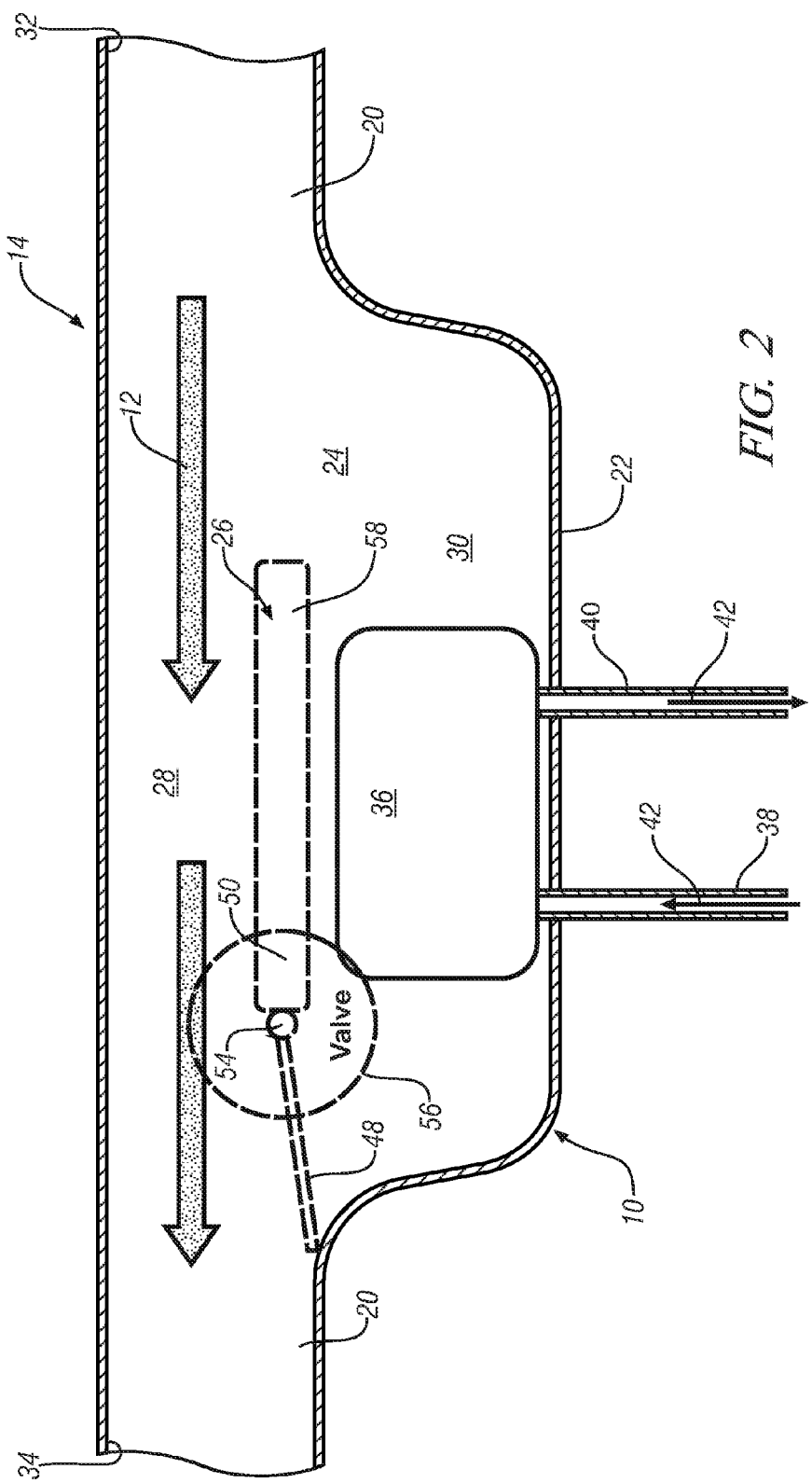
FIG. 2 is an enlarged schematic view of a portion of the exhaust treatment system of FIG. 1 in a first mode of operation.
Figure 3:
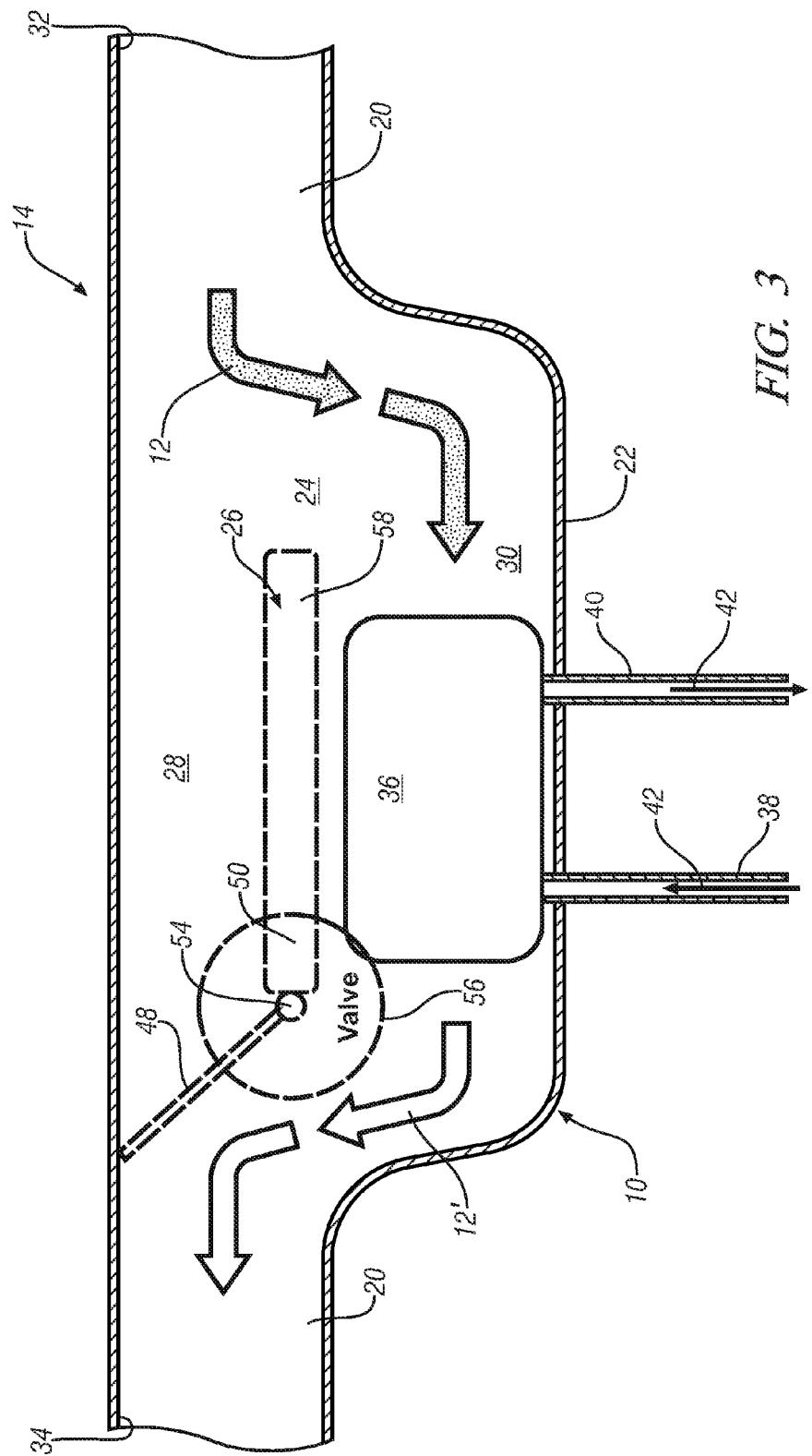
FIG. 3 is an enlarged schematic view of a portion of the exhaust treatment system of FIG. 1 in a second mode of operation.

Referring to FIGS. 1-3, an exemplary embodiment is directed to an exhaust heat recovery system 10, for the recovery of waste heat from the exhaust gas 12 in an exhaust treatment system 14 of an internal combustion engine 16 for a motor vehicle 17. The internal combustion engine 16 discharges hot exhaust gas 12 from exhaust ports (not shown) and into an exhaust collector such as exhaust manifold 18. An exhaust system conduit 20 receives the exhaust gas 12 from the exhaust manifold 18 and transports the exhaust gas downstream to one or more exhaust treatment devices (not shown) that are configured to convert various regulated constituents of the exhaust gas 12 into non-regulated components prior to their release to the atmosphere. Such exhaust treatment devices may vary by type depending on the engine (diesel, gasoline, etc.).

Disposed within the exhaust treatment system 14, at a location that is proximate to or inside of the exhaust manifold 18, is an exhaust heat recovery ("EHC") apparatus 22. Referring to FIGS. 2 and 3, in an exemplary embodiment, the EHC 22 comprises a volumetrically enlarged portion 24 that is divided by a longitudinally extending wall portion or flow divider 26 to define first and second flow passages 28 and 30, respectively. A flow inlet 32 receives hot exhaust gas 12 from the exhaust treatment system 14 and a flow outlet 34 conducts exhaust gas from the EHC 22. First flow passage 28 is configured as a flow-through passage that allows the exhaust gas 12 to transit the EHC 22 without the recovery of any waste heat or energy therefrom, FIG. 2. Second flow passage 30 houses a heat exchanger/energy recovery unit 36 therein that is configured to recover waste heat or energy from exhaust gas 12 passing therethrough, FIG. 3.

Inlet and outlet conduits 38 and 40, respectively, communicate with the heat exchanger/energy recovery unit 36 to deliver a working fluid 42 such as engine coolant thereto and to remove it therefrom. Other examples of suitable working fluids may be ambient air or a compressed gas, for instance. In an exemplary embodiment, the heat exchanger/energy recovery unit 36 may include passages (not shown) that separate the working fluid 42 from the exhaust gas 12 but that allow for efficient transfer of heat or energy from the hot exhaust gas to the relatively cool working fluid 42. Once removed from the heat exchanger/energy recovery unit 36 the heated working fluid 42 may be distributed to various vehicle components or systems such as the internal combustion engine 16, the transmission 58, the vehicle interior HVAC system 60, the exhaust treatment system 14, or a combination thereof. Alternatively, the recovered heat may be used to generate electricity through thermo-electric power generator 62 in which a temperature differential creates a voltage which may be used by the electrical system of the vehicle 17.

The EHC 22 as well as the various vehicle components and systems that receive waste heat or energy from the EHC may be monitored by a controller such as powertrain or vehicle controller 44 that is in signal communication with various sensors such as temperature sensors 46 in heat exchanger/energy recovery unit 36, internal combustion engine 16, transmission 58, vehicle interior 60 or thermo-electric power generator 62, for example. As used herein the term controller may include an application specific integrated circuit (ASIC), an electronic circuit, a processor (shared, dedicated or group) and memory that executes one or more software or firmware programs, a combinational logic circuit, and/or other suitable components that provide the described functionality.

In an exemplary embodiment, a flow control valve 48 is pivotally connected to the downstream end 50 of the longitudinally extending wall portion 26 and is configured to pivot about an axis that extends in the direction of the pivot post 54. A flow control valve actuator 56, is associated with the exterior of the EHC 22 and is operable to move the flow control valve 48 from a first, bypass position, FIG. 2, in which the un-cooled exhaust gas 12 transits the EHC 22 without passing through the heat exchanger/energy recovery unit 36 and a second, heat recovery position, FIG. 3, in which un-cooled exhaust gas 12 entering the EHC 22 is forced to pass through the heat exchanger/energy recovery unit 36 where waste heat from the exhaust gas is transferred to the working fluid 42 and cooled exhaust gas 12' exits therefrom. The flow control valve actuator 56 is in signal communication with the controller 44 and receives actuation signals from the controller that results in selective positioning of the flow control valve 48 (ex. open, closed, partially opened) to maintain the heat exchanger/energy recovery unit 36 and other vehicle systems receiving recovered heat from the working fluid 42 at predetermined temperatures based on signals from the various sensors described herein.

Due to the high temperatures that are experienced by both the flow control valve 48 and the flow control valve actuator 56, the location of the valve at the downstream end 50 of the longitudinally extending wall portion 26 of the EHC 22 allows for a more robust valve and actuator due to the lower temperatures encountered at the downstream end 50 rather than the upstream end 58. As the exhaust gas 12, 12' transits the exhaust treatment system 14 the temperature loss can range from about 50° C. to about 125° C. per foot. The thermal load imposed upon the exhaust gas 12, 12' as it transits either the first or the second flow passages 28, 30 of the EHC 22, are enough to significantly benefit the durability of the flow control valve 48 and associated actuator 56, or to allow for a reduction in the robustness and resulting cost of the valve and actuator due to the lower temperature environment in the downstream location.

Figure 4:
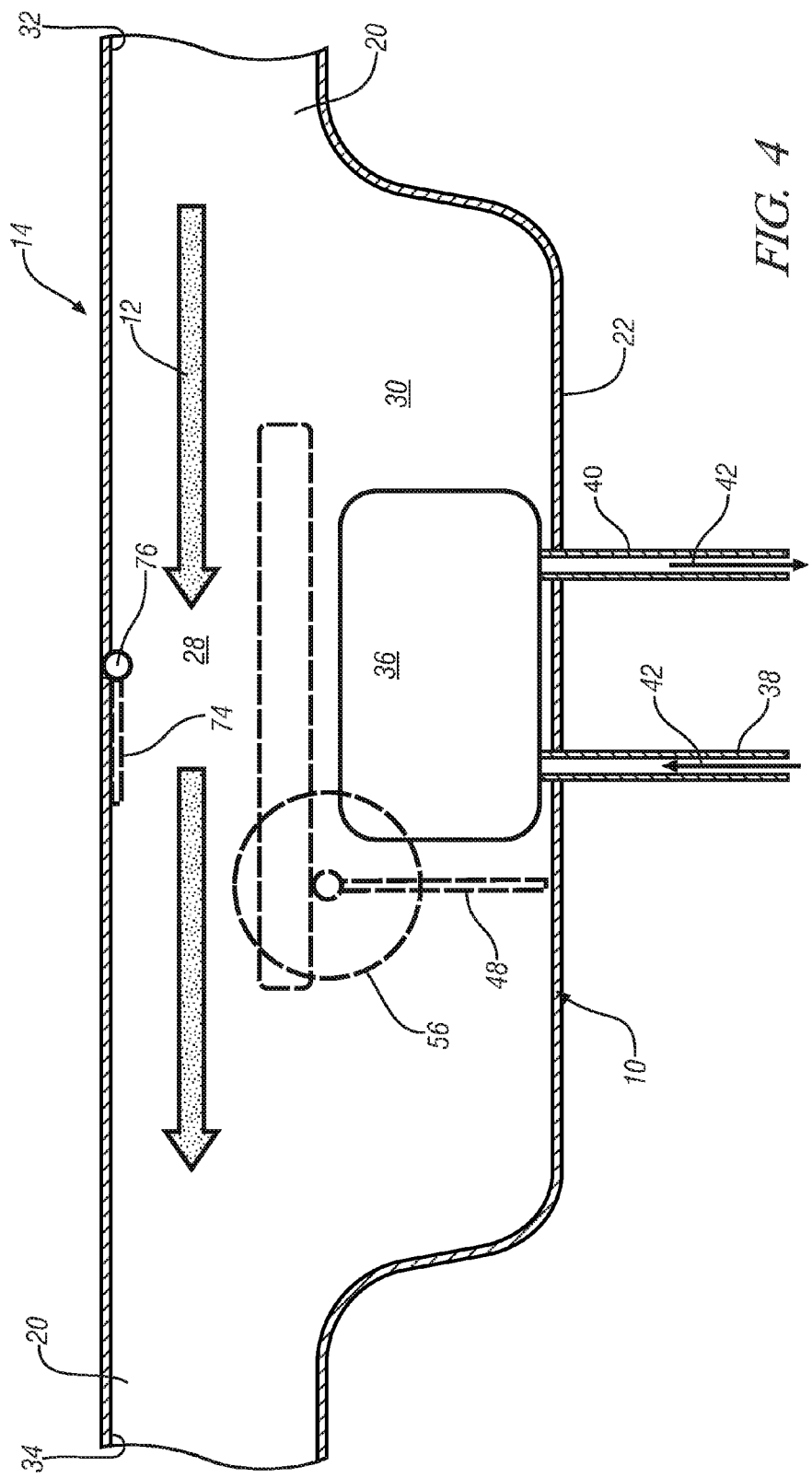
FIG. 4 is an enlarged schematic view of another embodiment of a portion of the exhaust treatment system of FIG. 1 in a first mode of operation.
Figure 5:
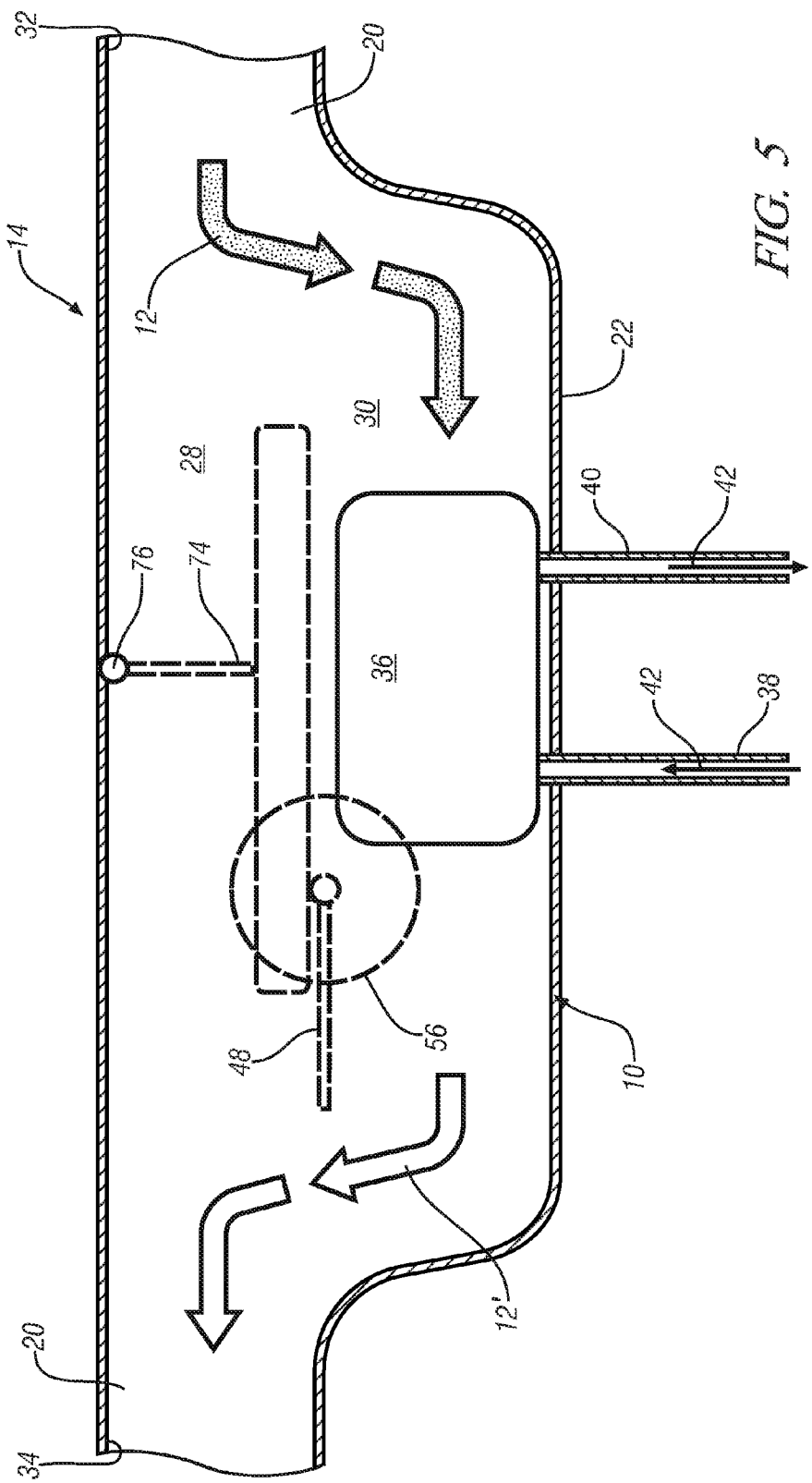
FIG. 5 is an enlarged schematic view of another embodiment of a portion of the exhaust treatment system of FIG. 1 in a second mode of operation.

Referring now to FIGS. 4 and 5, in another exemplary embodiment of the present invention, the exhaust system conduit 20 of the EHC 22 is shown divided into first and second flow passages 28, 30 respectively. The flow passage 28 conducts the exhaust gas 12 directly through the exhaust treatment system and to various downstream after treatment devices (not shown) that treat regulated constituents of the exhaust gas 12 prior to its release to the atmosphere, FIG. 4. The second flow passage 30 conducts the exhaust gas to and through the heat exchanger/energy recovery unit 36 of the EHC 22, FIG. 5. Inlet and outlet conduits 38 and 40, respectively, fluidly communicate with the heat exchanger/energy recovery unit 36 to deliver a working fluid 42, such as engine coolant, thereto and to remove it therefrom. Once removed from the heat exchanger/energy recovery unit 36, the heated working fluid 42 may be distributed to selected vehicle components or systems.

The EHC 22, as well as the various vehicle components and systems that receive waste heat or energy from the EHC, may be monitored by a controller such as powertrain or vehicle controller 44, FIG. 1, which is in signal communication with various sensors such as temperature sensor 46 in heat exchanger/energy recovery unit 36. In an exemplary embodiment, a flow control valve 48 is disposed within the second flow passage 30, downstream of the heat exchanger/energy recovery unit 36. A flow control valve actuator 56, is associated with the flow control valve 48 and is operable to move the flow control valve 48 from a closed position, FIG. 4, in which the exhaust gas 12 transits first flow passage 28 without passing through the heat exchanger/energy recovery unit 36 and an open, heat recovery position, FIG. 5, in which exhaust gas 12 is free to pass through the heat exchanger/energy recovery unit 36 where waste heat is transferred to the working fluid 42. The flow control valve actuator 56 is in signal communication with the controller 44 and receives signals from the controller that results in proper positioning of the flow control valve 48 to maintain the heat exchanger/energy recovery unit 36 and other vehicle systems receiving recovered heat from the working fluid 42 at predetermined temperatures.

In the embodiment illustrated in FIGS. 4 and 5, a second, passive flow control valve 74 is disposed in first flow passage 28. The passive flow control valve 74 may utilize a biasing member such as spring 76 that exerts a predetermined closing torque appropriate for the valve cross-sectional area to allow the valve 74 to close at a predetermined pressure difference across valve 74 (about 5 kPA). During operation of the internal combustion engine 16, the controller 44 commands the flow control valve actuator 56 to open the flow control valve 48 and allow exhaust gas 12 to flow through the heat exchanger/energy recovery unit 36 for the extraction of waste heat therefrom. Upon a determination by the controller 44 that heat recovery is no longer desired, the controller will command the flow control valve actuator 56 to close the flow control valve 48 resulting in an increase in exhaust system backpressure upstream of the heat exchanger/energy recovery unit 36 and the passive flow control valve 74. When the exhaust backpressure exceeds the predetermined closing force of the biasing member 76, the passive flow control valve 74 will open allowing the exhaust gas 12 to transit the EHC 22 through the first flow passage 28. The application of a passive flow control valve 74 is useful as a failsafe device to assure that exhaust flow 12 can transit the EHC 22 should the flow control valve 48 or the flow control actuator 56 fail, leaving the valve in a closed position.

Due to the high temperatures that are experienced by both the flow control valve 48 and the flow control valve actuator 56, the location of the valve downstream of the heat exchanger/energy recovery unit 36 allows for a more robust valve and actuator due to the lower temperatures encountered at that location. As the exhaust gas 12 transits the exhaust treatment system 14 the temperature loss can range from about 50° C. to about 125° C. per foot. The thermal load imposed upon the exhaust gas 12 as it transits the heat exchanger/energy recovery unit 36 of the EHC 22 are enough to significantly benefit the durability of the flow control valve 48 and associated actuator 56 due to the lower temperature environment in the downstream location.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. An exhaust system for a vehicle having an internal combustion engine, a transmission, and an HVAC system, the exhaust system comprising:
    an exhaust gas conduit configured to receive exhaust gas from an exhaust port of the internal combustion engine;
    a downstream exhaust heat recovery apparatus configured to receive the exhaust gas, the exhaust heat recovery apparatus further comprising;
    a volumetrically enlarged portion;
    a longitudinally extending flow divider disposed in the volumetrically enlarged portion defining a first flow passage in fluid communication with the exhaust gas conduit and a second flow passage in fluid communication with the exhaust gas conduit;
    a heat exchanger/energy recovery unit disposed in the second flow passage and having a working fluid inlet and outlet for circulation of a working fluid therethrough and exchange of heat from the exhaust gas to the working fluid, wherein the heat exchanger/energy recovery unit is thermally coupled to the internal combustion engine, the transmission, and the HVAC system;
    a first temperature sensor thermally coupled to the heat exchanger/energy recovery unit;
    a second temperature sensor thermally coupled to the internal combustion engine;
    a third temperature sensor thermally coupled to the transmission;
    a fourth temperature sensor thermally coupled to the HVAC system;
    a flow control valve connected to a downstream end of the longitudinally extending flow divider in a low temperature region of the exhaust heat recovery apparatus and configured to selectively direct exhaust gas through the first flow passage, the second flow passage or a combination thereof; and
    a controller in signal communication with the first, second, third, and fourth temperature sensors, the controller programmed to actuate the flow control valve to selectively direct exhaust the gas through the second flow passage and associated heat exchanger/energy recovery unit such that a temperature of the internal combustion engine, a temperature of the transmission, and a temperature of the HVAC system are maintained at a desired temperature.

2. The exhaust system of claim 1, further comprising a thermo-electric power generator thermally coupled to the heat exchanger/energy recovery unit, the thermo-electric power generator configured to generate electricity.

3. An exhaust system for an internal combustion engine, the exhaust system comprising:
    an exhaust gas conduit configured to receive exhaust gas from an exhaust port of the internal combustion engine;

a downstream exhaust heat recovery apparatus configured to receive the exhaust gas, the downstream exhaust heat recovery apparatus further comprising:

a first flow passage in fluid communication with the exhaust gas conduit;

a second flow passage in fluid communication with the exhaust gas conduit;

a heat exchanger/energy recovery unit disposed in the second flow passage for exchange of heat from the exhaust gas thereto;

a flow control valve disposed downstream of the first and the second flow passages in a low temperature region of the downstream exhaust heat recovery apparatus to selectively direct exhaust gas through the first flow passage, the second flow passage or a combination thereof;

a temperature sensor configured to sense a temperature of the heat exchanger/energy recovery unit; and a controller in signal communication with the temperature sensor, the controller programmed to actuate the flow control valve to a first position in a first mode, a second position in a second mode, and a third position in a third mode, wherein:

in the first position, the flow control valve is positioned across the second flow passage to facilitate preventing exhaust gas flow through the second flow passage;

in the second position, the flow control valve is positioned across the first flow passage to facilitate exhaust gas flow through the second flow passage for heat exchange with the heat exchanger/energy recovery unit; and in the third position, the controller is programmed to maintain the flow control valve in a position between the first position and the second position to facilitate exhaust gas flow through both the first flow passage and the second flow passage for maintaining a desired temperature in the heat exchanger/energy recovery unit.

* * * * *